3,040,394
APPARATUS FOR MAKING SHELL MOULDS
OR CORES
Victor Hornig, Moseley, Birmingham, and John Edward Clarke, Small Heath, Birmingham, England, assignors to Shell Moulding Foundry Limited, Bordesley Green, Birmingham, England
Filed Nov. 30, 1959, Ser. No. 856,278
6 Claims. (Cl. 22—36)

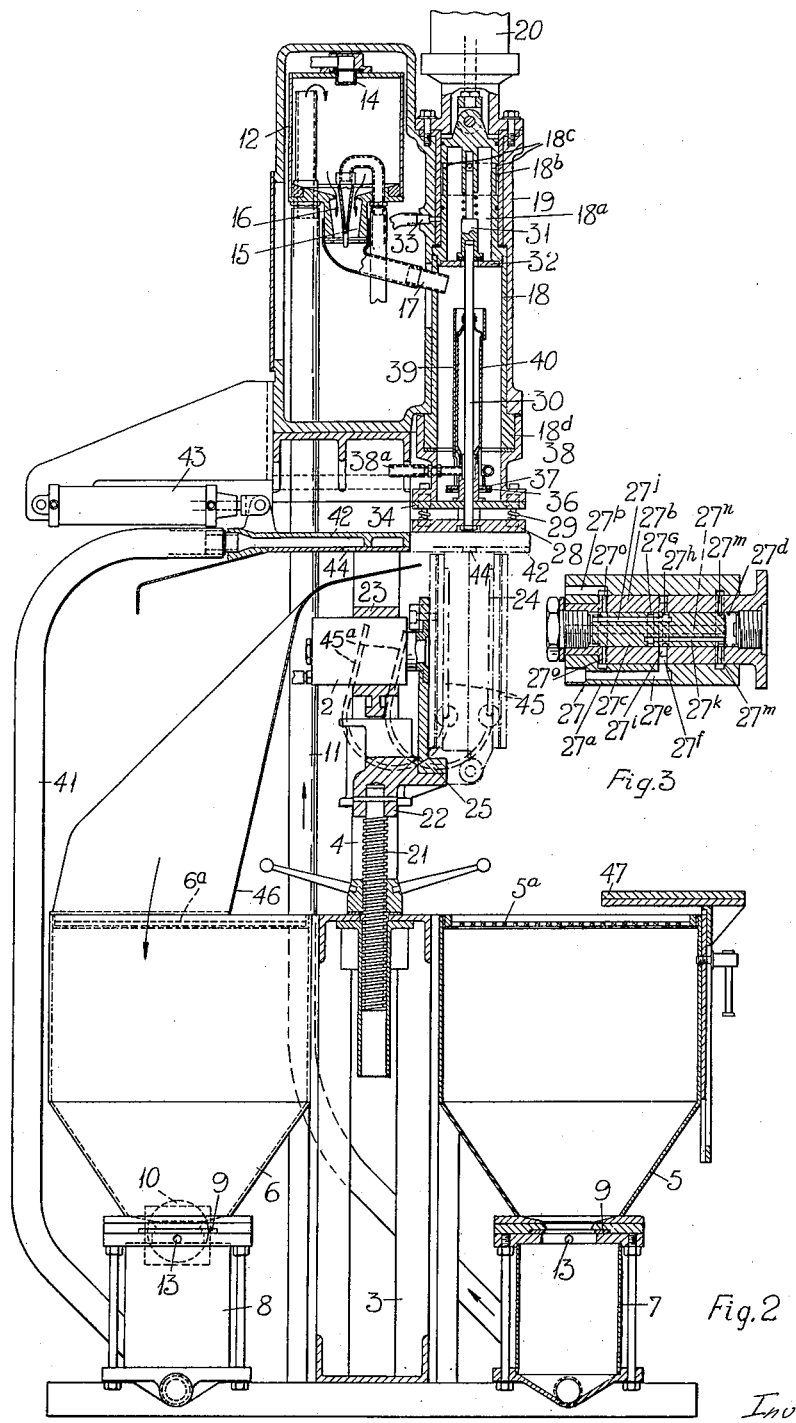

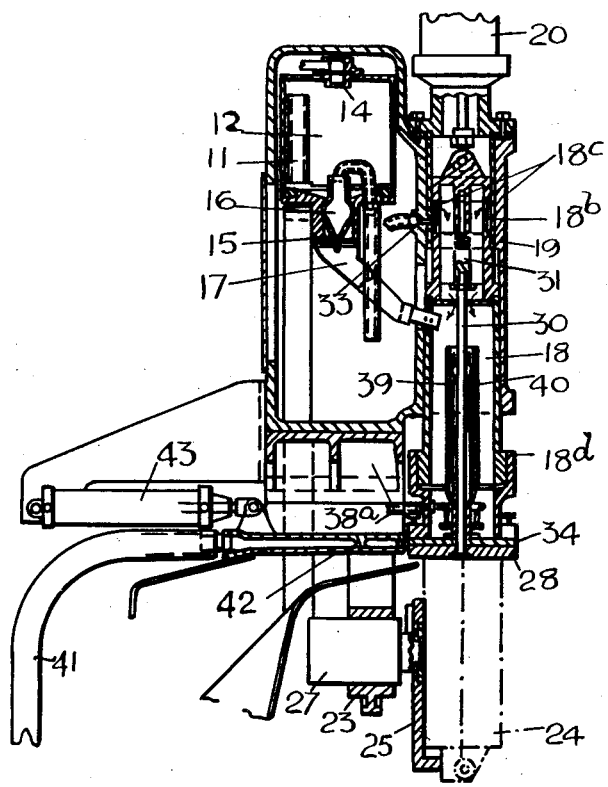
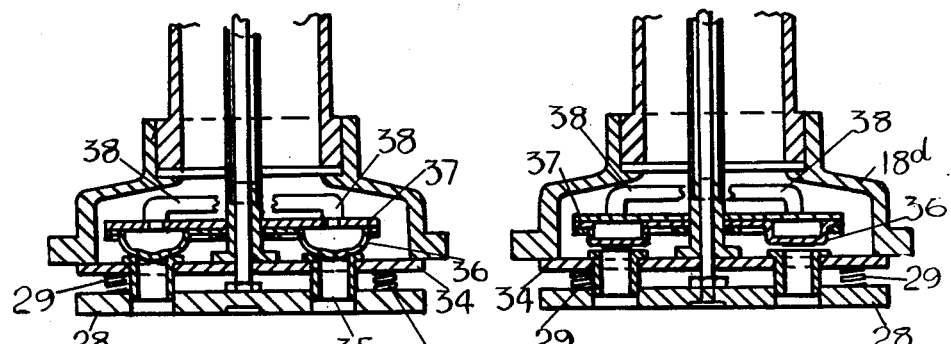
Fig. 4.
Fig. 5.   Fig. 6.

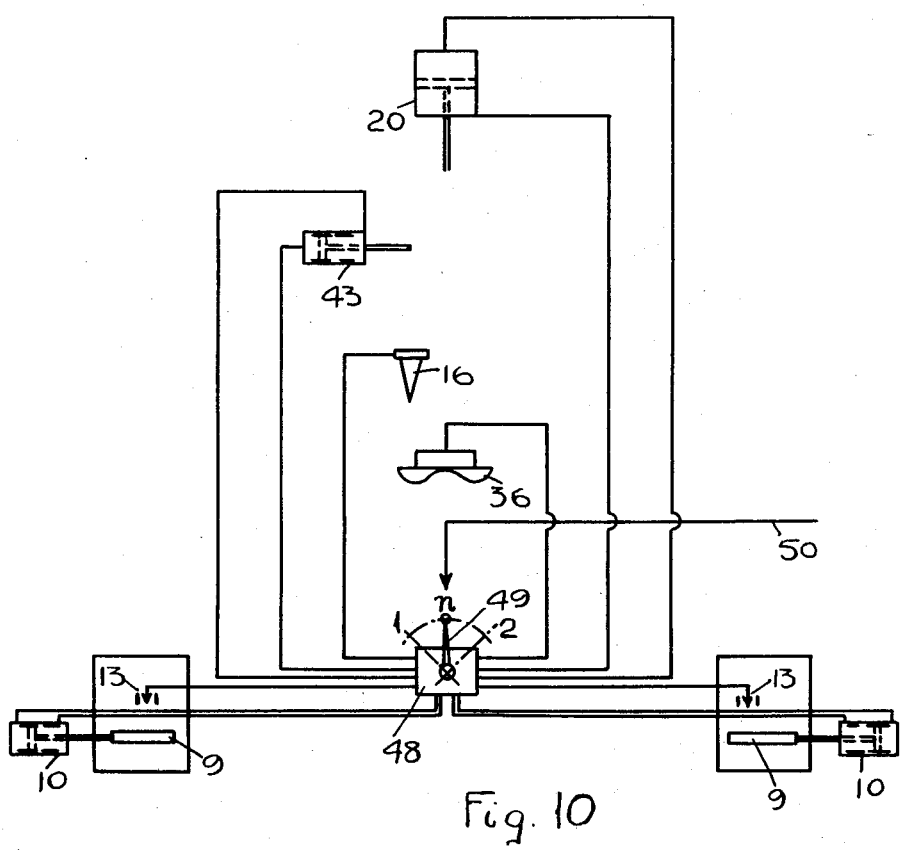

In the specification of application Serial No. 856,276, now abandoned, are described and claimed shell moulds or shell cores having their walls formed of an admixture of sand or other suitable flowable solid material and synthetic resin, and shaped externally so as to impose a desired pattern on cast metal, the space bounded by the walls being filled with solid flowable packing material. Also in the said specification there is described and claimed a method of manufacturing shell moulds or shell cores the external surfaces of which are shaped so as to impose a desired pattern on cast metal in which method an admixture of sand or other suitable flowable solid material and resin is brought into contact with a heated pattern so as to form a hollow thin walled shell, the space enclosed by the thin walls being thereafter filled with a solid flowable packing material.

The object of the present invention is to provide in a convenient form apparatus whereby such filled shell moulds, or cores can be manufactured by the aforesaid method, and hereinafter the admixture of sand or other suitable flowable solid material and resin will be referred to as the resin compound, whilst the solid flowable packing material will be referred to as sand though other granular materials may be used for filling the mould.

Apparatus according to the invention comprises in combination a frame, a carrier on the frame, said carrier being adapted for the attachment thereto of a pattern box, feed means for blowing resin compound into a pattern box on the carrier, means whereby the carrier can be inverted to admit of the discharge from a pattern box of excess compound, and further feed means for blowing sand or other solid flowable packing material into the pattern box, whilst on the carrier.

In the accompanying drawings FIGURE 1 is a part-sectional front elevation of an example of the invention, and FIGURE 2 is a sectional side elevation, whilst FIGURE 3 is a sectional view to an enlarged scale of the vibrator seen in FIGURE 2.

FIGURE 4 is a fragmentary sectional side elevation similar to the upper portion of FIGURE 2, but showing some of the parts in different positions.

FIGURE 5 is a fragmentary sectional front elevation illustrating, to a larger scale than FIGURE 1, the closed position of a valve for controlling the supply of resin compound to the pattern box.

FIGURE 6 is a similar view to FIGURE 5, but illustrates the open position of the valve.

FIGURE 10 is a diagram illustrating a mode of controlling the admission of fluid under pressure to various parts of the apparatus.

Figure 1:
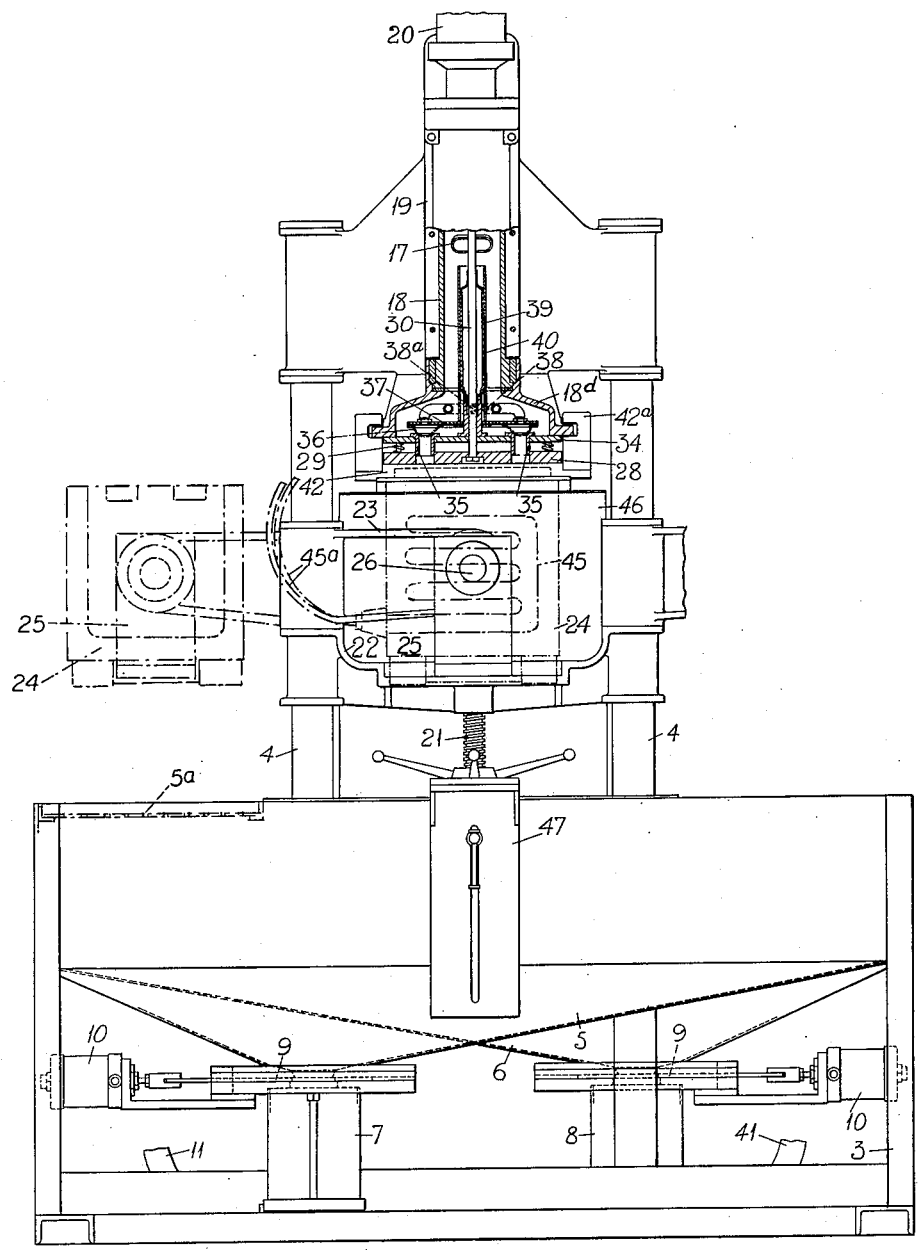

Referring to the drawings there is provided a frame 3 incorporating a pair of upstanding posts 4. Within the lower part of the frame is mounted a pair of hopper-like containers 5, 6 for resin compound and sand respectively, the upper ends of these containers being covered by screens 5ª, 6ª through which the resin compound and sand can be supplied to the containers. Below the containers 5, 6 are two measuring chambers 7, 8 respectively, each chamber being separated from its associated container by a slidable valve plate 9 operable by a pneumatically actuated piston in a cylinder 10.

The lower end of the chamber 7 is connected by a pipe 11 to a feed chamber 12 within a main body part 19 carried by the posts 4. Moreover, the chamber 7 has an air inlet 13, and the arrangement is such that when air under pressure is supplied to the inlet 13 with the associated valve plate 9 closed, any resin compound within the chamber 7 will be blown through the pipe 11 into the feed chamber 12 from which air can escape by way of an exhaust 14.

At the lower end of the feed chamber 12 is an outlet 15 which is controlled by a valve member 16 in the form of a hollow inflatable diaphragm which when inflated will close the outlet 15 as shown in FIGURE 4. The outlet 15 is connected by a flexible tubular chute 17 to a feed cylinder 18 which is supported in the body part 19 on the posts 4, so as to be movable vertically by a fluid actuated piston in a cylinder 20.

Vertically adjustable on the posts 4 by means of a screw 21 is a cross-head 22. On the cross-head is mounted an arm having pivotally connected thereto on a horizontal axis 26 (FIGURE 1) a carrier 25 to which a pattern box 24 is attached. The carrier arm 23 is angularly movable about one of the posts 4 to and from a position (shown in full lines in FIGURES 1 and 2) in which the pattern box is supported by the cross-head in a vertically disposed filling position beneath the lower end of the feed cylinder 18. When the carrier 25 is moved by the arm 23 to the position shown in broken lines in FIGURE 1, the carrier can be turned about its horizontal axis for inverting the pattern box 24. Moreover, the carrier arm incorporates a fluid actuated vibrator mechanism 27 to be referred to in detail hereinafter whereby the pattern box can be vibrated to discharge excess material when in the inverted position as will be described.

Figure 7:
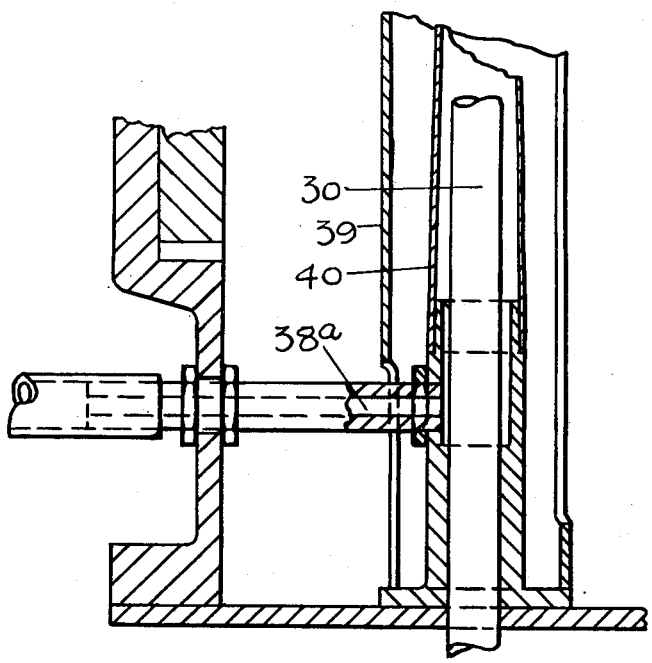
FIGURE 7 is a fragmentary sectional side elevation illustrating to a larger scale than FIGURE 2, one of the air inlets.

Attached to the lower end of the feed cylinder 18 is a sealing plate 28 which is capable of limited vertical movement relative to the cylinder 18 against the action of springs 29. The plate 28 is connected to a push rod 30 extending through the cylinder 18 into a blind bore in a spring-loaded valve member 31. The member 31 cooperates with a seating in a partition 32 between the upper end of the cylinder 18 and a transfer chamber 18ª which is secured to the upper end of the cylinder, and to which air can be admitted through an inlet 33 when the cylinder 18 is moved downwardly to a position (shown in FIGURE 4) in which the inlet is in register with an annular groove 18ᵇ formed in the outer periphery of the transfer chamber and communicating with the interior of the chamber through ports 18ᶜ. On the lower end of the cylinder 18 is mounted a blowing head 18ᵈ which at its lower end is closed by a plate 34 incorporating tubular outlets 35 slidable within complementary holes in the sealing plate 28, and adapted to register with inlets (not shown) in the pattern box. Moreover, cooperating with the outlets 35 is a closure member 36 in the form of an inflatable diaphragm forming with a plate 37 a closed chamber to which air under pressure can be admitted through inlets 38 to cause the member 36 to close the outlets 35 as shown in FIGURES 1 and 5. Also mounted coaxially within the cylinder 18 is a rigid and slotted sleeve 39 containing an inflatable tubular diaphragm 40 to which air under pressure can be admitted through an inlet 38ª shown in FIGURES 1, 2 and 7.

The chamber 8 is connected by a flexible pipe 41 to a feed head 42 which is movable horizontally by a fluid actuated piston in a cylinder 43, between an inoperative position (shown in full lines in FIGURE 2), and an operative position (shown in broken lines in FIGURE 2) in which outlets 44 in the head are positioned in register with the aforesaid inlets in the pattern box, when the latter is in the filling position shown in the drawings (i.e. the same position in which the pattern box is disposed to receive resin compound from the cylinder 18). When the head 42 is moved to the operative position parts 42$^a$ thereon engage with guides on the blowing head 18$^d$. Moreover, the piston in the cylinder 20 descends to clamp the head 42 against the pattern box 24. When the blowing head 18$^d$ is correctly clamped a switch (not shown) is actuated to open a valve controlling the inlet 13 to the chamber 8.

The pattern box incorporates electric heating elements 45 to which electric current is supplied through cables 45$^a$ so that the pattern box can be maintained in a heated condition, and the manner of filling the pattern box to form a shell mould or core therein is as follows: The piston in the cylinder 10 associated with the container 5 is actuated to open the corresponding valve plate 9 and thereby enable a predetermined quantity of resin compound to descend from the container 5 to the chamber 7. When this valve plate 9 is closed the resin compound in the chamber 7 is fed to the feed chamber 12 whilst the outlet 15 thereof is closed by the inflated valve member 16 as shown in FIGURE 4. This valve member is subsequently deflated to open the outlet 15 as shown in FIGURE 2, whereupon the resin compound in the feed chamber flows by gravity to the cylinder 18 and blowing head 18$^d$ whilst the diaphragms 36 and 40 are inflated. At a predetermined instant in the cycle of operations a valve (not shown) is actuated to cause the deflation of the diaphragm 40 and the inflation of the valve member 16 as shown in FIGURE 4 (the cylinder 18 at this instant being in its raised position). When the diaphragm 40 is deflated any material still within the outlet 15 can flow towards the cylinder irrespective of the cylinder having previously been filled. This flow through the outlet allows the valve member 16 to close.

Figure 8:
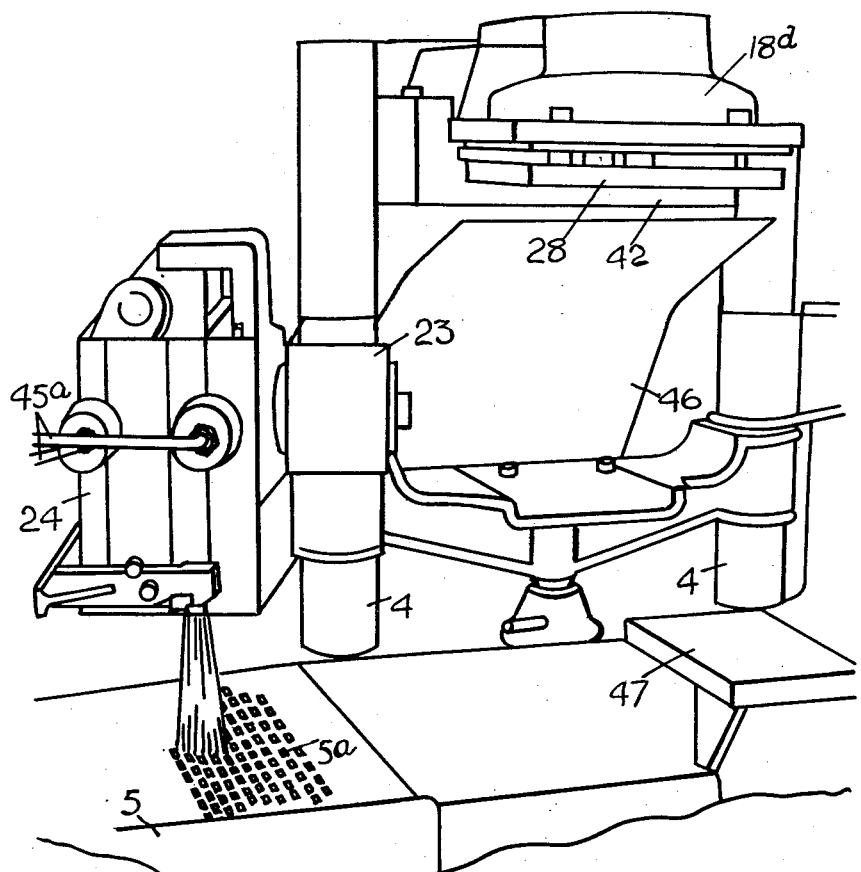
FIGURE 8 is a perspective view showing the pattern box out of its service position and inverted.

When the outlet 15 is closed air pressure is admitted to the cylinder 20 with the result that the cylinder 18 descends. As the plate 28 contacts the pattern box with resilient pressure it is arrested, and continued downward movement of the cylinder 18 will cause the valve member 31 to be removed from its seating, and the inlet 33 to register with the groove 18$^b$ as shown in FIGURE 4. Diaphragm 36 is now deflated as shown in FIGURE 6 and the resin compound within the cylinder 18 is blown through the outlets 35 into the heated pattern box under the pressure of the air supplied to the transfer chamber 18$^a$ through the inlet 33. A proportion of the compound adheres to the internal periphery of the pattern box to form a shell, the thickness of this shell depending upon the time for which the flowing pressure is maintained. The cylinder 18 is then raised. At this time also the diaphragm 36 is inflated thus sealing outlets 35, whilst the diaphragm 40 is inflated, and the member 16 is deflated. The carrier arm 23 together with the pattern box 24 is then moved angularly about one of the posts 4 until the pattern box is disposed above the screen 5$^a$ covering the container 5. In this position the pattern box is inverted as shown in FIGURE 8 and fluid pressure is admitted to the vibrator 27 thereby removing excess compound from the box and returning it to the container 5. Subsequently the carrier arm and pattern box are returned to the position shown in full lines in FIGURES 1 and 2, and the head 42 is moved to the operative position shown in broken lines in FIGURE 2. In this position of the head 42 sand previously fed to the chamber 8 from the container 6 is blown through the head into the shell within the pattern box, until the shell is packed with sand. The head 42 is then withdrawn to the position shown in full lines in FIGURE 2, and during this movement any free sand will be directed back into the container 6 by the baffle 46.

Figure 9:
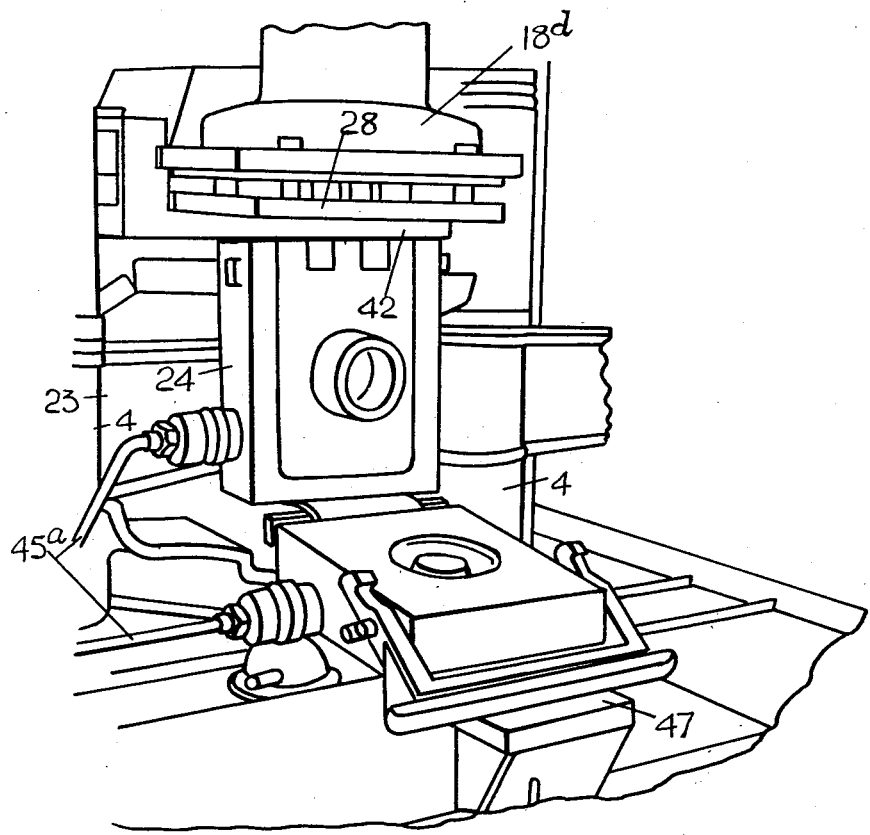
FIGURE 9 is a similar view to FIGURE 8, but shows the pattern box opened while in its service position.

At this stage the filled shell is completed, and can be removed from the pattern box which is desirably formed as two hingedly interconnected parts. The vibrator may be used to assist the removal which is effected after turning the outer part of the mould box into contact with a vertically adjustable unloading table 47 as shown in FIGURE 9.

Referring to FIGURE 3 the vibrator 27 includes a body part 27$^a$ mounted within the arm 23 and having a stepped cylindrical bore. Within the bore is a complementarily stepped cylinder 27$^b$ which at one end is connected to the carrier 25, and which serves to support the latter on the horizontal axis 26 (FIGURE 1). Within the bore of the cylinder 27$^b$ is a reciprocable and cylindrical hammer 27$^c$ which is loaded in one direction by a spring 27$^d$.

In the body 27$^a$ is formed an inlet passage 27$^e$ which at its inner end communicates with a circumferentially extending groove 27$^f$ formed in the external periphery of the cylinder 27$^b$, whilst in the periphery of the hammer 27$^c$ are a pair of circumferentially extending grooves 27$^g$, 27$^h$ one or other of which is in register with a radial port 27$^i$ extending from the groove 27$^f$ when the hammer is at opposite ends of its permitted travel within the cylinder.

The groove 27$^h$ is in communication with the end of the cylinder remote from that incorporating the spring 27$^d$, through a passage 27$^j$ formed in the hammer, whilst the groove 27$^g$ is in communication with the opposite end of the cylinder through a passage 27$^k$ in the hammer.

The latter end of the cylinder incorporates exhaust ports 27$^m$ which are covered by the hammer when it is moved against the action of the spring, these ports 27$^m$ being in communication with an exhaust passage 27$^n$ formed in the body part 27$^a$. At the other end of the cylinder are similarly disposed exhaust ports 27$^o$ communicating with an exhaust passage 27$^p$.

When the vibrator is inoperative the hammer assumes the position shown under the action of the spring. However, when fluid pressure is admitted to the inlet 27$^e$ it is admitted to the end of the cylinder remote from that incorporating the spring by way of groove 27$^f$, port 27$^i$, groove 27$^h$ and passage 27$^j$. As a result the hammer will be moved to the opposite end of the cylinder against the action of the spring, the fluid in this opposite end of the cylinder exhausting through ports 27$^m$ during the initial part of the movement. When the groove 27$^g$ registers with the port 27$^i$ the hammer will be moved in the opposite direction fluid being exhausted through ports 27$^o$ during the initial portion of this movement. Thus so long as fluid pressure is admitted to the inlet 27$^e$ the hammer will continue to be reciprocated and thereby impart vibrations to the part 25 and any pattern box 24 thereon.

Conveniently, two similar arms 23 are provided on the two posts 4 respectively for alternative use, although only one has been described.

The valves for controlling the admission of fluid pressure under to the cylinders 10, 20 and 43, to the diaphragms 16, 36, and 40, to the inlets 13, and to the vibrator 27 are conveniently under the control of automatic means (not shown) whereby they can be actuated in the correct sequence.

A mode of controlling the admission of fluid under pressure to the cylinders 10, 20 and 43, the inflatable diaphragms 16 and 36, and the inlets 13, is illustrated diagrammatically in FIGURE 10. Thus, a control unit 48 is provided with an operating lever 49 which is movable between positions indicated respectively by $n$, 1 and 2. When the operating lever 49 occupies the position $n$, air under pressure from a main inlet 50 has access to (1) the lower end of the cylinder 20 for retaining the feed cylinder 18 in its uppermost position, (2) the inner end of the cylinder 43 for retaining the feed head 42 in its inoperative position, and (3) the inflatable closure member 36 for closing the outlets 35 of the blowing head 18ᵈ. When the operating lever 49 is moved to the position 1, air under pressure from the main inlet 50 has access to (1) the upper end of the cylinder 20 for moving the feed cylinder 18 to its lowermost position, (2) the inner end of the cylinder 43 for retaining the feed head 42 in its inoperative position, (3) the inflatable closure member 16 for closing the outlet 15 of the feed chamber 12, and (4) the outer end of the cylinder 10 for closing the valve plate 9 between the measuring chamber 7 and the associated container 5. When the operating lever 49 is moved to the position 2, air under pressure from the main inlet 50 has access to (1) the outer end of the cylinder 43 for moving the feed head 42 to its operative position, (2) the upper end of the cylinder 20 for moving the feed cylinder 18 downwardly, (3) the inflatable closure member 36 for closing the outlets 35 of the blowing head 18ᵈ, (4) the outer end of the cylinder 10 for closing the valve plate 9 between the measuring chamber 8 and the associated container 6, and (5) the measuring chamber 8 through the corresponding inlet 13.

Having thus described our invention what we claim as new and desire to secure by Letters Patent is:

1. Apparatus for making shell moulds or shell cores in the form of hollow structures consisting of resin compound and filled with flowable particles of packing material, comprising in combination a supporting frame, a carrier mounted on said frame and capable of pivotal movements about vertical and horizontal axes, a heatable pattern box mounted on said carrier and provided at its upper end with at least one opening, a vertically movable feed receptacle carried by said frame at a position above said carrier and provided at its lower end with at least one outlet for registering with the opening in the upper end of said pattern box, a horizontally movable hollow feed head provided at its underside with at least one outlet, and carried by said frame in an initial position from which it is movable to a service position, between said pattern box and said feed receptacle, wherein its outlet registers with the opening in the upper end of said pattern box, means carried by said frame for supplying the resin compound, which consists of flowable solid particles incorporating a bonding agent in the form of synthetic resin, to said feed receptacle, means carried by said frame for supplying the packing material to said feed head under air pressure, first valve means for controlling the supply of the resin compound to said feed receptacle, second valve means under the control of which resin compound can be blown from said feed receptacle into said pattern box when said feed head is in its initial position, means by which said carrier is mounted on said frame, and which includes a member pivotally movable about a horizontal axis, and connected to said carrier so that the latter can be inverted by appropriate pivotal movement of said last-mentioned movable member for enabling excess resin compound to be discharged from said pattern box through the opening therein, and actuating means carried by said frame and connected to said feed head for moving the latter between its initial and service positions.

2. Apparatus according to claim 1, and comprising in combination a vertically movable cylinder constituting said feed receptacle, a spring-loaded and apertured sealing plate carried by the lower end of said cylinder, and movable against its spring loading by contact with the upper end of said pattern box when said cylinder is moved downwardly to an appropriate extent, and means operable by movement of said plate against its spring loading for actuating said second valve means to admit air under pressure to said cylinder for blowing the resin compound therefrom into said pattern box.

3. Apparatus according to claim 1, in which the means for supplying the resin compound to said feed receptacle comprise in combination a feed chamber carried by said frame and provided at its lower end with an outlet with which said first valve means co-operates, a tubular chute connecting the outlet of said feed chamber to said feed receptacle, a measuring chamber carried by the lower part of said frame, a container for supplying said measuring chamber with the resin compound, and a pipe which connects said container to said feed chamber, and through which resin compound is transferable from said measuring chamber to said feed chamber under air pressure.

4. Apparatus according to claim 1, wherein the means by which said carrier is mounted on said frame comprises an arm which is angularly movable on said frame about a vertical axis, and to which said carrier is pivotally connected on a horizontal axis.

5. Apparatus according to claim 3, in which the means for supplying the packing material to said feed head comprises in combination a second measuring chamber carried by the lower part of said frame, a second container for supplying said second measuring chamber with the packing material, and a pipe which connects said second measuring chamber to said feed head, and through which the packing material is transferable from said second measuring chamber to said feed head under air pressure.

6. Apparatus according to claim 4, and comprising a fluid-actuated vibrator through the medium of which said carrier is pivotally mounted on said arm, and by which said carrier and pattern box are vibratable.

References Cited in the file of this patent

UNITED STATES PATENTS

| 1,034,334 | Bannister | July 30, 1912 |
| 2,435,858 | Whitehead | Feb. 10, 1948 |
| 2,791,811 | Schmid | May 14, 1957 |

FOREIGN PATENTS

| 737,143 | Great Britain | Sept. 21, 1955 |
| 741,215 | Great Britain | Nov. 30, 1955 |